(12) United States Patent
Tolmei

(10) Patent No.: US 8,081,068 B1
(45) Date of Patent: Dec. 20, 2011

(54) CENTRE HIGH MOUNT STOP LAMP WITH CONSTITUENT SEATBELT DISENGAGEMENT INDICATOR

(76) Inventor: Vincent Ronald Tolmei, Concord, CA (US)

( * ) Notice: Subject to any disclaimer, the term of this patent is extended or adjusted under 35 U.S.C. 154(b) by 0 days.

(21) Appl. No.: 12/807,850

(22) Filed: Sep. 14, 2010

(51) Int. Cl.
*G08B 21/00* (2006.01)

(52) U.S. Cl. ............ 340/468; 340/463; 340/457.1; 340/461; 340/522

(58) Field of Classification Search .......... 340/457.1, 340/461, 468, 522
See application file for complete search history.

(56) References Cited

U.S. PATENT DOCUMENTS

| | | | |
|---|---|---|---|
| 4,849,733 A * | 7/1989 | Conigliaro et al. | 340/457.1 |
| 5,714,930 A * | 2/1998 | McKinney, Jr. | 340/468 |
| 5,770,999 A * | 6/1998 | Rhodes | 340/468 |
| 6,059,066 A | 5/2000 | Lary | |
| 6,215,395 B1 | 4/2001 | Slaughter et al. | |
| 6,545,597 B1 | 4/2003 | Blount | |
| 6,774,781 B1 * | 8/2004 | Lee | 340/468 |
| 7,199,703 B2 | 4/2007 | Okita et al. | |
| 7,528,709 B1 | 5/2009 | Maggiora | |
| 7,626,495 B2 | 12/2009 | Montague | |

OTHER PUBLICATIONS

"Seat Belt," Wikipedia, http://en.wikipedia.org/wiki/Seat_belt.

* cited by examiner

*Primary Examiner* — Jennifer Mehmood
*Assistant Examiner* — Mark Rushing
(74) *Attorney, Agent, or Firm* — D. Benjamin Borson; Borson Law Group, PC

(57) ABSTRACT

Embodiments of the invention detect and visually indicate to onlookers when a motor vehicle driver's and/or passenger's seatbelt is not engaged. An embodiment is comprised of control electronics, wiring, and an on-board Centre High Mount Stop Lamp ("CHMSL") mounted in the rear of the vehicle as the means of communication and deterrence.

5 Claims, 4 Drawing Sheets

CENTRE HIGH MOUNT STOP LAMP WITH CONSTITUENT SEATBELT DISENGAGEMENT INDICATOR

FIELD OF THE INVENTION

The present invention relates to automobile safety systems. In particular, this invention relates to automobile safety systems that provide a visual indication to others when a driver's or passenger's seatbelt is not engaged.

BACKGROUND

In the late 1950s, seatbelts were introduced to reduce injuries and fatalities resulting from sudden stops and/or collisions. Since that time, there has been an ongoing, and only partially successful endeavor to have drivers and passengers use seatbelts. Cities and states have granted police departments the authority to issue citations and a range of monetary fines against anyone found without their seatbelt engaged while the vehicle is being operated.

SUMMARY

Notwithstanding the powers to cite non-compliance with seatbelt laws, authorities continue to have difficulty in ascertaining when a passenger is not wearing a seatbelt, without implementing very sophisticated and costly presence detection equipment. This impediment is compounded by the necessity of having to retrofit older vehicles with new detection equipment.

Some positive steps toward public awareness have been made—for example, providing traffic signs that display safety slogans, such as "Click it or Ticket," in an effort to inform the public of the consequences of not buckling up. However, such measures cannot facilitate enforcement of the law through detection of the offenders.

I realized that because seatbelt and Centre High Mount Stop Lamp ("CHMSL") systems already are developed and accepted by transportation agencies, they can be incorporated into a newly-developed system, designed to be low in cost, and capable of being retrofitted for detecting and communicating when a passenger's seatbelt is not engaged.

Thus, aspects of the present invention relate to a safety system to visually indicate to onlookers when a passenger seatbelt, in a subject vehicle, is not engaged by using its on-board Centre High Mount Stop Lamp ("CHMSL") technology mounted in the rear of the vehicle as the means of communication. This aspect provides a back-up safety system for detecting and indicating when a seatbelt in a motor vehicle is disengaged. The system comprises the existing CHMSL and a new seatbelt disengagement indicator to visually communicate to onlookers that at least one seatbelt is not engaged in the vehicle. To do this, the CHMSL mounted in the rear of a subject vehicle is connected to a simple electronic sensor and switch mechanism to display to onlookers that a passenger is not wearing a seatbelt. I expect that informing onlookers that a seatbelt is not engaged will deter future transgressions and reduce, if not eliminate, injuries and/or fatalities from accidents involving passengers who fail to use their seatbelts.

BRIEF DESCRIPTION OF THE DRAWINGS

This invention is described on the basis of specific embodiments thereof. Other aspects of the invention and its advantages will be apparent to those skilled in the art of safety system design, and can be realized from a careful reading of the detailed description of the invention accompanied by the following drawings, in which.

DETAILED DESCRIPTION

Figure 1:
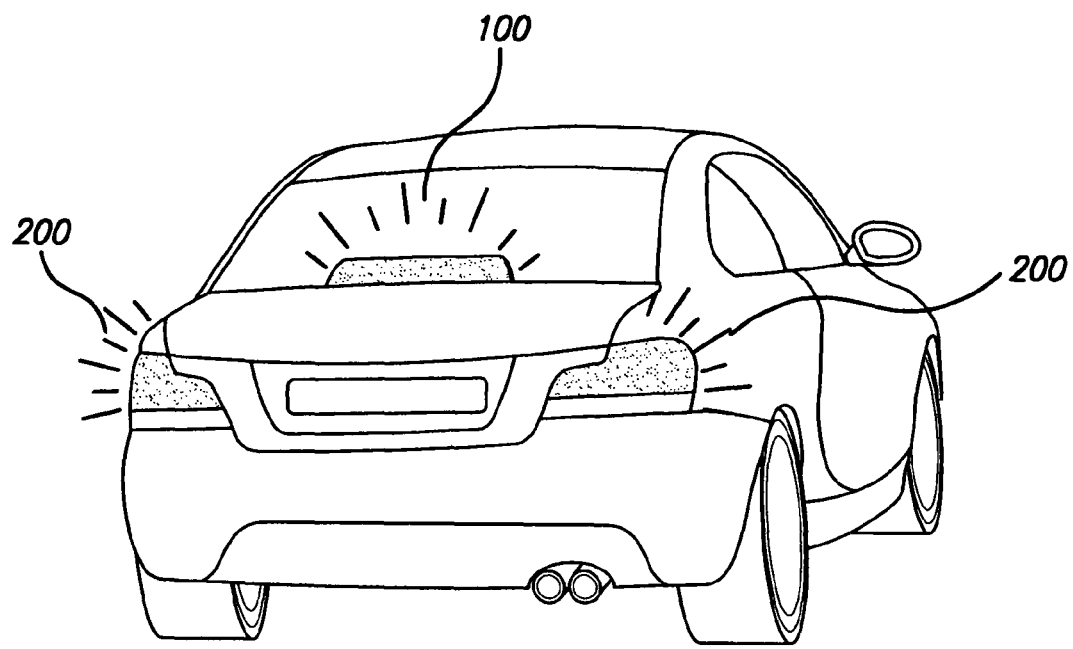
FIG. 1 depicts a motor vehicle showing the Centre High Mount Stop Lamp and rear brake lights being continuously illuminated when the brakes on the motor vehicle are applied.

Currently, there are at least three stop lights mounted on the rear of the motor vehicle that are illuminated whenever brakes are engaged. Under current standard practice, a seatbelt lamp is operated independently of the three brake lights, i.e., a disengaged seatbelt lamp that has no connection or interaction with the brake stop lights. It is standard operating practice that whenever a seatbelt in a current motor vehicle is disengaged, i.e., unlatched, a visual lamp indicator, and sometimes an acoustical indicator, usually on an instrument panel, will light up and remain illuminated until the offending seatbelt is engaged, i.e., latched.

An embodiment of the current invention connects the seatbelt disengagement light and the rear mounted CHMSL, such that whenever the seatbelt disengaged lamp is illuminated, and braking is not applied, the CHMSL blinks. However, when braking is applied, the CHMSL and the fender-mounted brake lights are illuminated continuously regardless of whether the seatbelt disengaged lamp is on or off.

This dual functionality enables an onlooker to discriminate easily between braking, the original intent of the CHMSL indicator and an indication that an occupant in the vehicle has his or her seatbelt disengaged. For example, an onlooker witnessing that a passenger did not have his seatbelt engaged, in the absence of braking, would observe blinking of the CHMSL indicator, but the fender-mounted brake lights would not be illuminated.

Of consequence the system, without further modification, is self-checking by disengaging a seatbelt, not applying brakes, and observing that the CHMSL indicator blinks due to the inherent redundancy.

Not only were the physical aspects of the design considered but also the effectiveness of the implementation to reduce the possibility of injury. Of importance was the issue of the learning curve time for observers, i.e., onlookers, to recognize the significance of the CHMSL blinking when brakes are off. Because the primary observers of interest, in ascertaining that a seatbelt in an operating motor vehicle is not engaged, are law enforcement officers, it is a trivial matter to disseminate the information via their channels of communication. Additionally, the general public could be informed using current Internet or web-based technology.

Further, the utilization of an existing and government-mandated CHMSL display ensures that the implementation, or retrofitting, of the system is easily accomplished, cost-effective, and timely.

Of concern in designing the system was the possible effect, or interference, with the intended use of the CHMSL to indicate that the driver is braking. In a worst case scenario where a third-party driver is unaware of the significance of a blinking CHMSL, as would be the case when a seatbelt is disengaged and braking is not applied, an approaching driver might initiate braking possibly impeding or slowing traffic, not an unsafe condition.

An additional aspect of the invention is its use as a braking system fault indicator. By way of example, where the brakes are not applied, and a seatbelt is not latched or otherwise engaged, a blinking CHMSL indicates not only that the seatbelt is disengaged, but also that the lamps function. In contrast, a possible fault in the braking system is indicated where the brakes are applied but the CHMSL and brake lights do not illuminate.

An additional aspect of the system of the invention is its ability to discriminate between braking and a disengaged seatbelt due to the CHMSL being sporadically or occasionally illuminated whenever braking is applied, but blinking whenever a seatbelt is disengaged and braking is not applied.

As a secondary attribute to the utilization of the CHMSL as an indicator of a disengaged seatbelt, it may be used to alert law enforcement of a distress situation, like a kidnapping, by indicating a mayday or SOS because it is covert to an assailant in the vehicle but overt to an observer.

Several patents disclose technologies that attempt to address the seatbelt non-compliance issue by proposing systems to disseminate the disadvantages of failing to wear a seatbelt. However, none meets transportation regulatory concerns, and none presents a low-cost solution that can be retrofitted to older vehicles.

In 1986, subsequent to the acceptance of seatbelts as useful in reducing injuries and/or fatalities, the U.S. Department of Transportation mandated installation of a rear, centrally, and laterally mounted stop lamp (i.e., brake light). The purpose of the new stop lamp in its new location was to provide a more highly-visible deceleration warning to drivers who might be unable to see the regular brake lights of the vehicles around them, due to obstruction or other reasons.

EXAMPLES

The following examples illustrate aspects of this invention and how these aspects provide solutions to the problems identified.

Example 1

Braking Applied and Seat Belts Engaged

Figure 7:
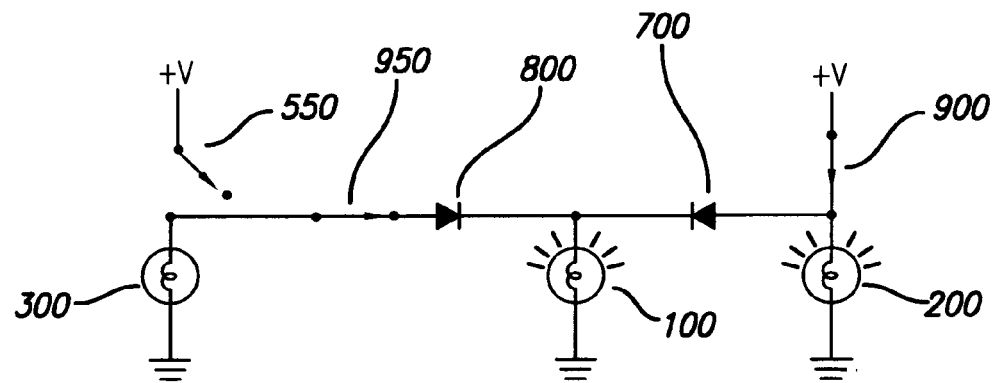
FIG. 7 is a schematic diagram showing the Centre High Mount Stop Lamp and rear brake lights being continuously illuminated when the brakes on the motor vehicle are applied and seatbelts are engaged.

FIG. 7 depicts an example of a circuitry of the invention where braking is applied and seat belts are engaged.

When a motor vehicle operator applies the brakes of an automobile, brake switch 900 of FIG. 7 closes. FIG. 1 depicts the Centre High Mount Stop Lamp 100 and rear brake lights 200, which are illuminated continuously when brake switch 900 is closed. Closing brake switch 900 applies power from V+ to brake lights 200 and the anode of diode 700 (FIG. 7). Diode 700 is forward-biased, so it continuously supplies power to the Centre High Mount Stop Lamp 100 when switch 900 is closed. Under these circumstances (i.e., brakes applied and seat belts engaged), power also is supplied to the cathode of diode 800. However, because diode 800 is reversed-biased, it blocks electrical power from being applied to flasher 950 and to dashboard instrument panel seatbelt indicator 300. As a result, the CHMSL 100 does not flash, and the dashboard instrument panel seatbelt indicator 300 is not illuminated.

Figure 5:
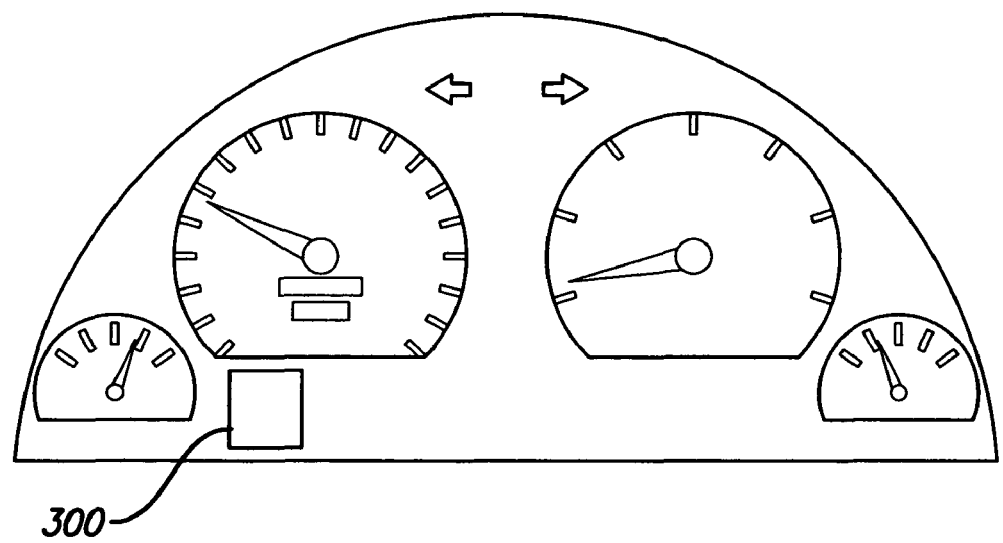
FIG. 5 depicts a motor vehicle's dashboard instrument panel indicator, indicating that a seatbelt is engaged.
Figure 6:
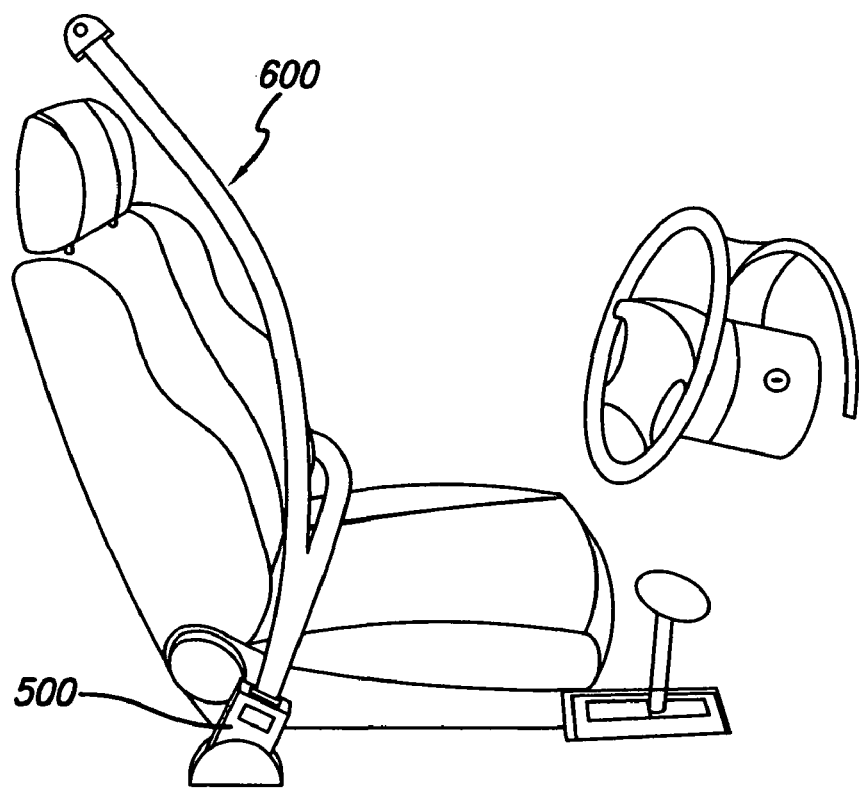
FIG. 6 depicts a motor vehicle showing a seatbelt engaged.

The consequences for the dashboard instrument panel seatbelt indicator 300 now are explained in greater detail for the situation where seatbelts are engaged. FIG. 5 shows dashboard instrument panel seatbelt indicator 300 being off when connecting seatbelt 600 of FIG. 6 to connecting buckle 500. The indicator 300 is off because when the seatbelt 600 and connecting buckle 500 are engaged, the switch 550 of FIG. 7 is open. Opening switch 550 of FIG. 7 removes the V+power to dashboard instrument panel seatbelt indicator 300, and indicator 300 is not illuminated.

Example 2

Braking Applied and Seat Belt Disengaged

In this scenario, as in the one above, when a motor vehicle operator applies brakes, switch 900 closes (as seen in FIG. 7). As a result, power from V+ is applied continuously to brake lights 200 of FIG. 1, and to CHMSL 100, via forward-biased diode 700 of FIG. 7.

Because the seatbelts are not engaged, switch 550 (FIG. 8) is closed, and the dashboard instrument panel seatbelt indicator 300 is illuminated with power from V+. The forward-biased anode of diode 800 (FIG. 8) also supplies power, via flasher 950 to the CHMSL 100 when switch 550 is closed. However, because this is a parallel redundant path (i.e., redundant to V+ continuously to forward-biased diode 700 of FIG. 7), it does not cause CHMSL 100 to blink.

In many vehicles, passenger seats have pressure sensors to detect the presence of passengers. Therefore, unless a passenger is actually sitting in a particular seat, a "seat belt disengaged" warning provided by this invention is not triggered. Conversely, if a passenger is seated in a particular seat, the sensor in that seat enables the warning of this invention, so that if the passenger's seat belt is disengaged, the CHMSL warning is provided.

Example 3

No Braking Applied and Seat Belt Engaged

Figure 2:
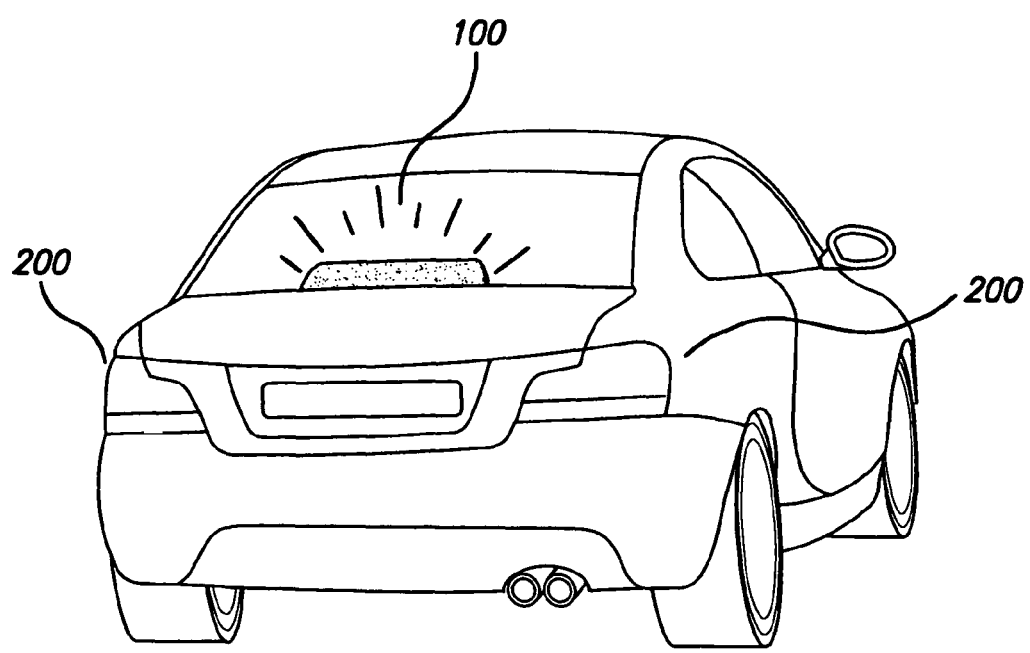
FIG. 2 depicts a motor vehicle showing the Centre High Mount Stop Lamp blinking when a seatbelt is disengaged but the brakes are not applied.
Figure 3:
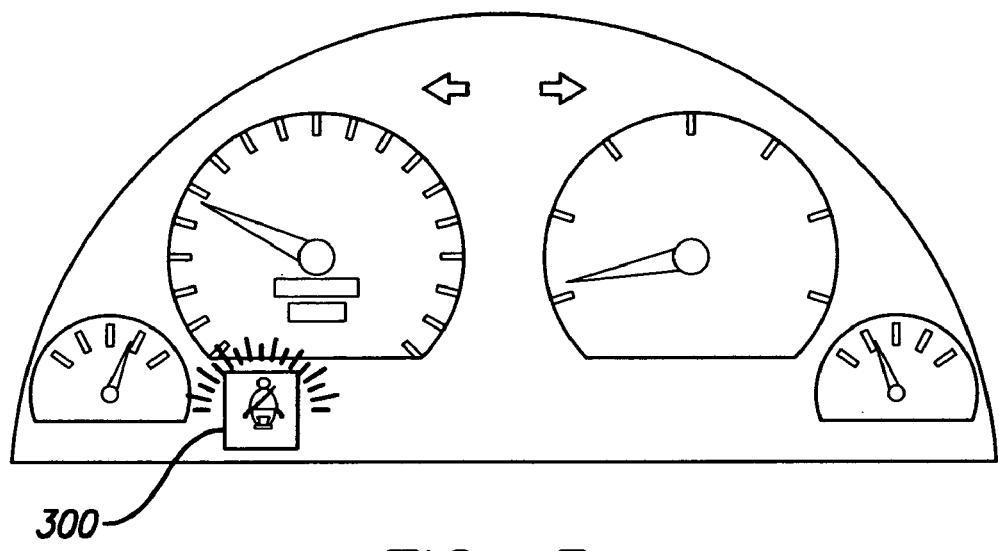
FIG. 3 depicts a motor vehicle's dashboard instrument panel indicator illuminated, indicating that a seatbelt is disengaged
Figure 4:
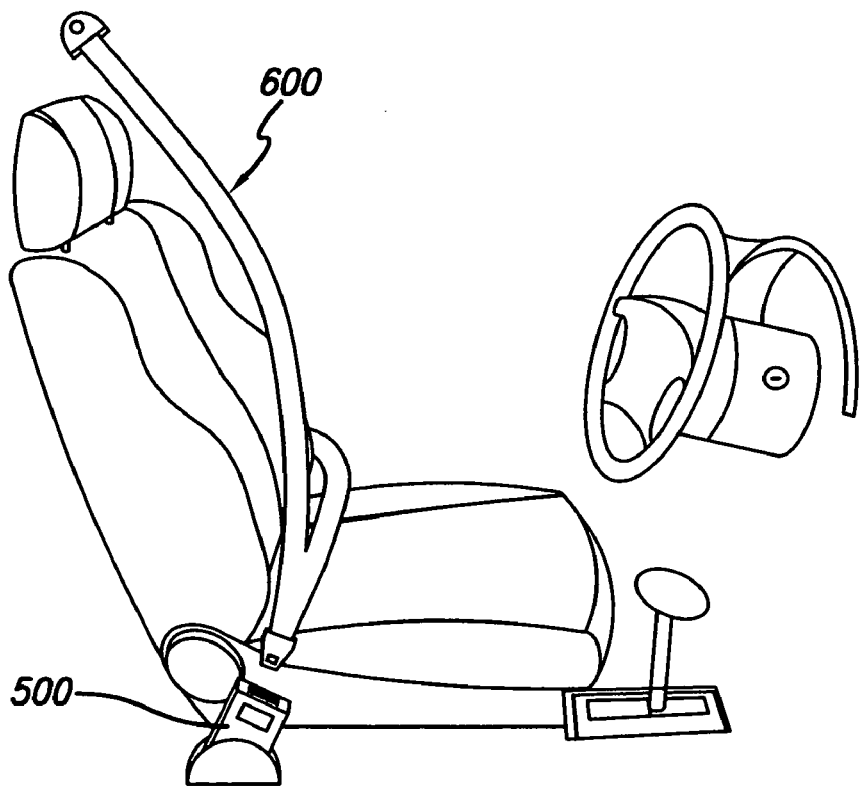
FIG. 4 depicts a motor vehicle showing a seatbelt disengaged.
Figure 8:
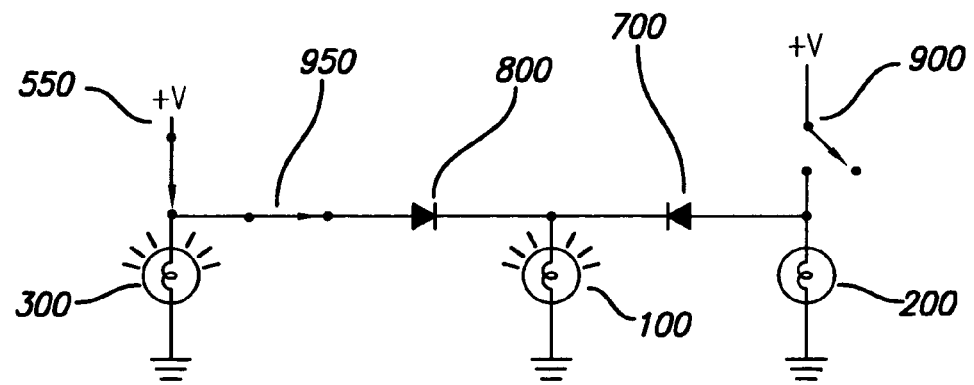
FIG. 8 is a schematic diagram showing the Centre High Mount Stop Lamp blinking, the brakes are not applied, and at least one seatbelt is disengaged.

In this situation, both the CHMSL 100 and brake lights 200 of FIG. 1 and FIG. 2 are not illuminated because switch 900 of FIG. 8 and switch 550 of FIG. 7 are both open and therefore power from +V is not available.

Example 4

No Braking Applied and Seat Belts Disengaged

FIG. 8 depicts an embodiment of a circuit of the invention in which seat belts are disengaged and brakes are not applied. In this and similar embodiments, the CHMSL 100 will be observed to blink or flash or provide some similar disrupted or distinguishable signal. The brake lights 200 will not be illuminated, and the dashboard instrument panel seatbelt indicator 300 will be illuminated.

When seat belt 600 is disengaged from its connecting buckle 500, switch 550 (FIG. 8) is closed, and the dashboard instrument panel seatbelt indicator 300 is illuminated with power from V+. The forward-biased anode of diode 800 (FIG. 8) also supplies power to flasher 950 to the CHMSL 100 when switch 550 is closed, so that CHMSL 100 is observed to blink or flash. FIG. 2 depicts the CHMSL 100 blinking by flasher 950 thru diode 800 of FIG. 8.

Here, when no braking is applied, switch 900 is open (FIG. 8) and no V+ is applied to brake lights 200. Power from V+ is applied to the cathode of diode 700, because of the closed switch 550 (i.e., seat belts disengaged). However, because the cathode of diode 700 is reverse-biased, power is blocked and so not applied to brake light 200 (FIG. 8), which remains not illuminated.

There are, depending upon the complexity and desired capabilities, numerous ways of implementing a safety system to visually indicate to onlookers when a passenger seatbelt, in a subject vehicle, is not engaged. However, embodiments of the system of the invention described here use only three additional components; are retrofitted easily to older vehicles; are low cost; and do not require any additional vehicle-mounted displays.

The above methods and systems are included by way of example only. Other types of components and embodiments can be advantageously used. The systems and methods of the present invention are not limited to the embodiments shown as the invention includes a means for detecting and annunciating faults associated with braking via its redundant path to the Centre High Mount Stop Lamp.

This invention has been described with respect to specific embodiments thereof. Persons of ordinary skill in the art can apply the disclosures and teachings of this application to create other embodiments that are within the scope of this invention. All such embodiments are considered to be part of this invention.

I claim:

1. A system of a vehicle for visually indicating to an observer external to the vehicle whether a seatbelt is disengaged, comprising:
   an electrical circuit within the vehicle, the electrical circuit further comprising:
      a Centre High Mount Stop Lamp ("CHMSL") visible from the exterior of the vehicle, said CHMSL that indicates both braking status and seat belt engagement;
      a seatbelt switch being in an open position when the seatbelt is engaged and in a closed position when the seatbelt is disengaged;
      a brake switch being in a closed position when the brakes are applied and in an open position when the brakes are not applied; and
      a flasher causing the CHMSL to flash when the seatbelt switch is in the closed position and said seatbelt is not engaged and the brakes are not engaged;
   said circuit causing said CHMSL to be off when said seatbelt is engaged and said brakes are not engaged; and
   said circuit causing said CHMSL to become illuminated continuously when said brakes are engaged.

2. The system of claim 1, the electrical circuit further comprising:
   an internal seatbelt indicator light, the seatbelt indicator light configured to illuminate when the seatbelt switch is in the closed position.

3. The system of claim 1, the electrical circuit further comprising:
   a first diode, said first diode further comprising:
      a first forward-biased anode that supplies current to the CHMSL when the seatbelt switch is in the closed position; and
      a first reverse-biased cathode that blocks current from to the flasher and blocks current to the internal seatbelt indicator light when the seatbelt switch is in the open position.

4. The system of claim 3, the electrical circuit further comprising:
   a second diode, the second diode further comprising:
      a second forward-biased anode that supplies current to the CHMSL when the brake switch is in the closed position; and
      a second reverse-biased cathode that blocks current from going to the rear brake lights when the seatbelt switch is in the closed position, there is no braking, and the seatbelt is disengaged.

5. A vehicle-based system comprising:
   a flasher, said flasher being a component of circuitry in the vehicle and configured in the circuitry to cause a Centre High Mounted Stop Light CHMSL on an exterior of the vehicle to flash when a seatbelt switch is closed, the seatbelt switch is disengaged, and brakes are not applied;
   said circuit causing said CHMSL to become illuminated continuously when the seatbelt is not engaged and brakes are engaged;
   said circuit causing said CHMSL to be off when said seatbelt is engaged and said brakes are not engaged; and
   said circuit causing said CHMSL to become illuminated continuously when said brakes are engaged.

\* \* \* \* \*